(12) United States Patent
Yuzuriha et al.

(10) Patent No.: US 10,708,702 B2
(45) Date of Patent: Jul. 7, 2020

(54) SIGNAL PROCESSING METHOD AND SIGNAL PROCESSING DEVICE

(71) Applicant: Panasonic Intellectual Property Corporation of America, Torrance, CA (US)

(72) Inventors: Shinichi Yuzuriha, Osaka (JP); Takeo Kanamori, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/543,047

(22) Filed: Aug. 16, 2019

(65) Prior Publication Data

US 2020/0077214 A1    Mar. 5, 2020

Related U.S. Application Data

(60) Provisional application No. 62/724,234, filed on Aug. 29, 2018.

(30) Foreign Application Priority Data

Apr. 17, 2019  (JP) ................ 2019-078676

(51) Int. Cl.
*H04R 3/00*         (2006.01)
*H04R 29/00*        (2006.01)
(Continued)

(52) U.S. Cl.
CPC ........... *H04R 29/005* (2013.01); *H04R 1/406* (2013.01); *H04R 3/005* (2013.01); *H04R 3/04* (2013.01); *H04R 2430/01* (2013.01)

(58) Field of Classification Search
CPC ...... H04R 29/005; H04R 1/406; H04R 3/005; H04R 3/04
See application file for complete search history.

(56) References Cited

U.S. PATENT DOCUMENTS

2004/0141418 A1    7/2004  Matsuo et al.
2004/0185804 A1    9/2004  Kanamori et al.
(Continued)

FOREIGN PATENT DOCUMENTS

EP    1 640 971    3/2006
JP    5123595      1/2013
(Continued)

OTHER PUBLICATIONS

Partial European Search Report dated Jan. 28, 2020 in corresponding European Patent Application No. 19193581.6.
(Continued)

*Primary Examiner* — Simon King
(74) *Attorney, Agent, or Firm* — Wenderoth, Lind & Ponack, L.L.P.

(57) ABSTRACT

A signal processing method includes: multiplying at least one of M signals output from M microphones by a gain so as to equalize sound pressure levels of the M signals, the M signals representing sounds that arrive at the M microphones from a sound source located within a predetermined distance from the M microphones, M being an integer equal to or greater than two; delaying at least one of the M signals so as to resolve time discrepancies between the M signals, the time discrepancies being caused by differences in arrival time between sounds that arrive at the M microphones from the sound source; and applying a filter so as to suppress a signal which is included in the M signals obtained through the multiplying and the delaying and which represents a sound output from the sound source located within the predetermined distance.

8 Claims, 8 Drawing Sheets

(51) Int. Cl.
 *H04R 1/40* (2006.01)
 *H04R 3/04* (2006.01)

(56) References Cited

U.S. PATENT DOCUMENTS

| | | | | |
|---|---|---|---|---|
| 2005/0265559 | A1* | 12/2005 | Asada | H04S 7/301 |
| | | | | 381/18 |
| 2007/0019815 | A1* | 1/2007 | Asada | H04R 29/00 |
| | | | | 381/58 |
| 2010/0026858 | A1 | 2/2010 | Kanamori | |
| 2013/0287225 | A1 | 10/2013 | Niwa et al. | |
| 2015/0312690 | A1* | 10/2015 | Yuyama | H04R 29/002 |
| | | | | 381/59 |
| 2017/0164101 | A1* | 6/2017 | Rollow, IV | H04R 3/04 |

FOREIGN PATENT DOCUMENTS

| | | |
|---|---|---|
| JP | 5486694 | 5/2014 |
| WO | 2012/086834 | 6/2012 |

OTHER PUBLICATIONS

Extended European Search Report dated Mar. 19, 2020 in corresponding European Patent Application No. 19193581.6.

\* cited by examiner

SIGNAL PROCESSING METHOD AND SIGNAL PROCESSING DEVICE

CROSS REFERENCE TO RELATED APPLICATION

This application claims the benefit of priority of U.S. Provisional Application No. 62/724,234 filed on Aug. 29, 2018 and Japanese Patent Application Number 2019-078676 filed on Apr. 17, 2019, the entire contents of which are hereby incorporated by reference.

BACKGROUND

1. Technical Field

The present disclosure relates to a signal processing method, a signal processing device, and the like.

2. Description of the Related Art

As background art, there is a technique that assigns weights to sounds output from sound sources based on distance attenuation of sounds input to a plurality of microphones forming a microphone array, so as to suppress sound output from a place far from the microphones, by which sound output from a place close to the microphones are enhanced (see Japanese Patent No. 5123595). In addition, as background art, there is a technique that applies a filter that is designed based on transfer characteristics of direct sound and transfer characteristics of reflected sound, to collected sound so as to suppress sound output from a place far from a microphone and enhance sound output from a place close to the microphone or to suppress the sound output from the place close to the microphone and enhance the sound output from the place far from the microphone (see Japanese Patent No. 5486694).

SUMMARY

It is, however, difficult for the background art described above to effectively suppress output sound from a sound source located close to microphones.

Hence, the present disclosure provides a signal processing method and the like that are capable of suppressing, more effectively than before, output sound from a sound source located close to microphones.

A signal processing method and the related technologies according to an aspect of the present disclosure include: multiplying at least one of M signals output from M microphones by a gain so as to equalize sound pressure levels of the M signals, the M signals representing sounds that arrive at the M microphones from a sound source located within a predetermined distance from the M microphones, M being an integer equal to or greater than two; delaying at least one of the M signals so as to resolve time discrepancies between the M signals, the time discrepancies being caused by differences in arrival time between sounds that arrive at the M microphones from the sound source; and applying a filter to the M signals that are obtained through the multiplying and the delaying, so as to generate a signal in which a sound output from the sound source located within the predetermined distance is suppressed, wherein the sound source is located within the predetermined distance from a microphone included in the M microphones which is located closest to the sound source.

It should be noted that these general or specific aspects may be implemented by a device, a method, an integrated circuit, a computer program, or a computer-readable recording medium such as a compact disc read only memory (CD-ROM), or by any combination of devices, methods, integrated circuits, computer programs, or recording media.

A signal processing method and the like according to an aspect of the present disclosure are capable of suppressing, more effectively than before, output sound from a sound source located close to microphones.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

Figure 1:
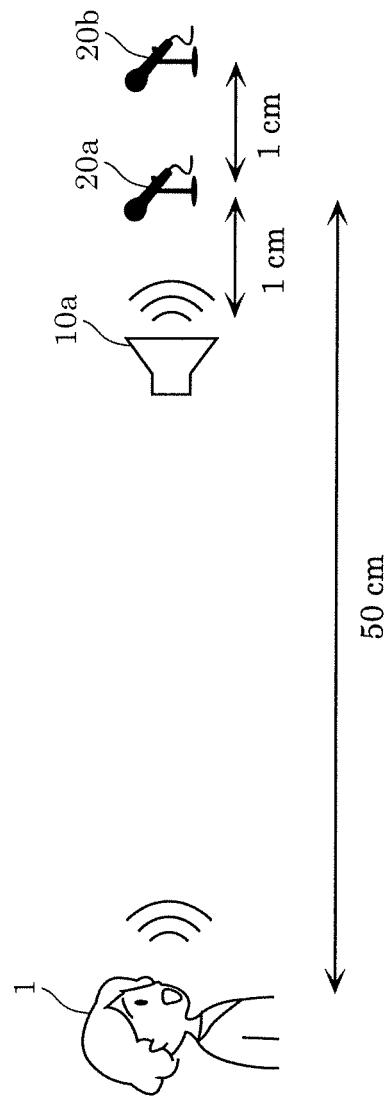
FIG. 1 is a diagram illustrating a positional relation between a loudspeaker and a speaking person in an embodiment.

DETAILED DESCRIPTION OF THE EMBODIMENT (Underlying Knowledge Forming the Basis of the Present Disclosure)

To be ready for the start of making mandatory installation of an emergency call system in a vehicle, a relatively small module into which microphones and a loudspeaker are integrated and that has an advantage in that, for example, the module can be subjected to tuning irrespective of a type of the vehicle, has become adopted for the emergency call system. In the emergency call system, it is assumed that a passenger such as a driver speaks by telephone to an operator or the like in case of emergency. Here, with a relatively small module in which microphones and a loudspeaker are close to each other, sound output from the loudspeaker happens to be input to the microphones. For that reason, the noise cancellation, which suppresses sound output from a loudspeaker and input to microphones, is adopted for such a module.

However, when the loudspeaker outputs a relatively loud sound, since the loudspeaker is relatively small, the output sound tends to include a distortion relative to input signal to the sound source. This distortion is difficult to remove by a conventional echo canceling technology. Therefore, in a case where output sound from a loudspeaker is input to a microphone, a distortion part cannot be suppressed by the echo cancellation.

By the technique described in Japanese Patent No. 5123595, in a case where sounds are output simultaneously from both of the places close to and far from the microphone, it is difficult to extract and enhance the sound output from the place close to the microphone, and the technique is susceptible to ambient noise. The technique described in Japanese Patent No. 5486694 has a problem in that the transfer characteristics of sound output from the sound source need to be measured based on positions of the microphone and the sound source. In addition, the technique described in Japanese Patent No. 5486694 requires factoring a sound collection environment into using the transfer characteristics because how sound reflects changes significantly according to an environment.

In view of the above circumstances, a signal processing method according to an aspect of the present disclosure includes: multiplying at least one of M signals output from M microphones by a gain so as to equalize sound pressure levels of the M signals, the M signals representing sounds that arrive at the M microphones from a sound source located within a predetermined distance from the M microphones, M being an integer equal to or greater than two; delaying at least one of the M signals so as to resolve time discrepancies between the M signals, the time discrepancies being caused by differences in arrival time between sounds that arrive at the M microphones from the sound source; and applying a filter to the M signals that are obtained through the multiplying and the delaying, so as to generate a signal in which a sound output from the sound source located within the predetermined distance is suppressed, wherein the sound source is located within the predetermined distance from a microphone included in the M microphones which is located closest to the sound source.

With this configuration, the signal processing method according to an aspect of the present disclosure can suppress the output sound itself from the sound source located within the predetermined distance from the microphone closest to the sound source. In addition, the signal processing method according to an aspect of the present disclosure can suppress the output sound from the sound source close to the microphone efficiently while not suppressing the output sound from the sound source far from the microphone, by multiplying the output sound from the sound source close to the microphone and the output sound from the sound source far from the microphone by the same gain. The signal processing method according to an aspect of the present disclosure can suppress sound output from a sound source such as a small loudspeaker that cannot be suppressed by the echo cancellation. That is, the signal processing method according to an aspect of the present disclosure can suppress output sound from the sound source close to the microphones together with a distortion of a sound output from the signal processing device.

For example, the predetermined distance may be a distance at most three times a longest spatial interval of spatial intervals between the M microphones.

With this configuration, the signal processing method according to an aspect of the present disclosure can suppress output sound from a sound source located at a distance that is at most three times a longest interval of intervals from the microphone closest to the sound source to the M microphones. A range defined by the distance that is at most three times the longest interval of intervals from the microphone closest to the sound source to the M microphones a range within which sound pressure levels of sounds input to the M microphones makes significant differences. Therefore, the signal processing method according to an aspect of the present disclosure can effectively suppress sound output from a sound source located within a range of the predetermined distance from a microphone.

For example, the predetermined distance may be a distance that makes a sound pressure level of a sound arriving, from the sound source, at the microphone located closest to the sound source at least 4/3 times higher than a sound pressure level of a sound arriving, from the sound source, at a microphone included in the M microphones which is located farthest from the sound source.

With this configuration, the signal processing method according to an aspect of the present disclosure can suppress sound from a sound source located at a distance that makes the sound pressure level of the sound input to the microphone closest to the sound source at least 4/3 times higher than the sound pressure level of the sound input to the microphone farthest from the sound source. The sound pressure level of the sound input to the microphone closest to the sound source being at least 4/3 times higher than the sound pressure level of the sound input to the microphone farthest from the sound source indicates an approximate lower limit value of a difference in sound pressure level of sounds input to microphones which can lead to suppression of the sound from the sound source close to the microphone. Therefore, the signal processing method according to an aspect of the present disclosure can effectively suppress sound output from a sound source located within a range of the predetermined distance from a microphone.

For example, the signal processing method according to an aspect of the present disclosure may further include calculating a spatial position at which the sound source is located.

With this configuration, the signal processing method according to an aspect of the present disclosure can calculate distances from the M microphones to the sound source. Therefore, the signal processing method according to an aspect of the present disclosure can suppress autonomously the output sound from the sound source located within the predetermined distance from the microphone closest to the sound source.

For example, the multiplying, the delaying, and the applying may be performed in a frequency domain.

With this configuration, the signal processing method according to an aspect of the present disclosure can treat the signals output from the microphones in the frequency domain. This enables the signal processing to be performed relatively easily.

For example, the multiplying, the delaying, and the applying may be performed in a time domain.

With this configuration, the signal processing method according to an aspect of the present disclosure can treat the signals output from the microphones in the time domain. This enables the signal processing to be performed according to time and strengths of the signals.

A signal processing device according to an aspect of the present disclosure is a signal processing device including: a gain controller configured to multiply at least one of M signals output from M microphones by a gain so as to equalize sound pressure levels of the M signals, the M signals representing sounds that arrive at the M microphones from a sound source located within a predetermined distance from the M microphones, M being an integer equal to or greater than two; a delayer configured to delay at least one of the M signals so as to resolve time discrepancies between the M signals, the time discrepancies being caused by differences in arrival time between sounds that arrive at the M microphones from the sound source; and a filtering processor configured to apply a filter to the M signals that are obtained by the gain controller and the delayer, so as to generate a signal in which a sound output from the sound source located within the predetermined distance is suppressed, wherein the sound source is located within the predetermined distance from a microphone included in the M microphones which is located closest to the sound source.

With this configuration, the signal processing device according to an aspect of the present disclosure can yield the same advantageous effects as the advantageous effects yielded by the signal processing method described above.

A program according to an aspect of the present disclosure may cause a computer to execute the signal processing method described above.

With this, the program according to an aspect of the present disclosure can yield the same advantageous effects as the advantageous effects yielded by the signal processing method described above.

The following describes an exemplary embodiment with reference to the drawings.

It should be noted that the following exemplary embodiment shows a general or specific example. The numerical values, shapes, materials, structural elements, the arrangement and connection of the structural elements, etc. illustrated in the following embodiment are mere examples, and are not intended to limit the scope of the claims. Among the structural elements in the following exemplary embodiment, those not recited in any of the independent claims representing the most generic inventive concepts will be described as optional elements. It should also be noted that the drawings are schematic and do not necessarily provide precise depictions. Throughout the drawings, the same reference signs are given to essentially the same structural elements, and redundant descriptions will be omitted or simplified.

Embodiment

[Positional Relation Between a Loudspeaker and a Speaking Person in an Aspect of the Present Disclosure]

FIG. 1 is a diagram illustrating a positional relation between a loudspeaker and a speaking person in an embodiment. As illustrated in FIG. 1, loudspeaker 10a is set up close to microphone 20a. For example, a distance between loudspeaker 10a and microphone 20a is about 1 cm. In addition, the distance between loudspeaker 10a and microphone 20a may be about several centimeters. Microphone 20b is set up close to microphone 20a. For example, a distance between microphone 20a and microphone 20b is about 1 cm. In addition, the distance between microphone 20a and microphone 20b may be several centimeters.

Here, the distance between loudspeaker 10a and microphone 20b is longer than the distance between loudspeaker 10a and microphone 20a. The distance between loudspeaker 10a and microphone 20b is about several times the distance between loudspeaker 10a and microphone 20a. For example, the distance between loudspeaker 10a and microphone 20b is about 2 cm, which is twice the distance between loudspeaker 10a and microphone 20a.

Next, as illustrated in FIG. 1, speaking person 1 is located at a position farther than loudspeaker 10a as viewed from microphone 20a. For example, a distance between speaking person 1 and microphone 20a is about 50 cm. The distance between speaking person 1 and microphone 20a may be several tens of centimeters or several meters. In addition, speaking person 1 is located at a position farther than loudspeaker 10a as viewed from microphone 20b. For example, a distance between speaking person 1 and microphone 20b is about 51 cm. The distance between speaking person 1 and microphone 20b may be several tens of centimeters or several meters. Here, there is little difference between the distance between speaking person 1 and microphone 20b and the distance between speaking person 1 and microphone 20a. For example, the distance between speaking person 1 and microphone 20b is about 51 cm, which is about 1.02 times the distance between speaking person 1 and microphone 20a.

In general, a sound pressure level of sound decreases in proportion to a distance. Therefore, since the distance between loudspeaker 10a and microphone 20b is about twice the distance between loudspeaker 10a and microphone 20a, a magnitude of an output sound of loudspeaker 10a input to microphone 20a is about twice a magnitude of an output sound of loudspeaker 10a input to microphone 20b. In contrast, since the distance between speaking person 1 and microphone 20b is about 1.02 times the distance between speaking person 1 and microphone 20a, a magnitude of a sound made by speaking person 1 and input to microphone 20a is about 1.02 times a magnitude of a sound made by speaking person 1 and input to microphone 20b. That is, there is little difference between the magnitude of the sound made by speaking person 1 and input to microphone 20a and the magnitude of the sound made by speaking person 1 and input to microphone 20b.

In this manner, sound output by loudspeaker 10a makes a difference in reception about sound collection between microphone 20a and microphone 20b. For example, the difference in reception between microphone 20a and microphone 20b is about 6 dB. In contrast, sound made by speaking person 1 makes little difference in reception about sound collection between microphone 20a and microphone 20b.

Note that the distance among speaking person 1, loudspeaker 10a, microphone 20a, and microphone 20b may be any distances as long as a relationship in which loudspeaker 10a, microphone 20a, and microphone 20b are disposed close to each other and speaking person 1 is sufficiently separated from microphone 20a and microphone 20b is kept. In addition, speaking person 1 may be a loudspeaker other than loudspeaker 10a. Alternatively, speaking person 1 may be one of various kinds of sound sources other than a loudspeaker.

[Signal Processing Method and Signal Processing Device in an Aspect of the Present Disclosure]

Figure 2:
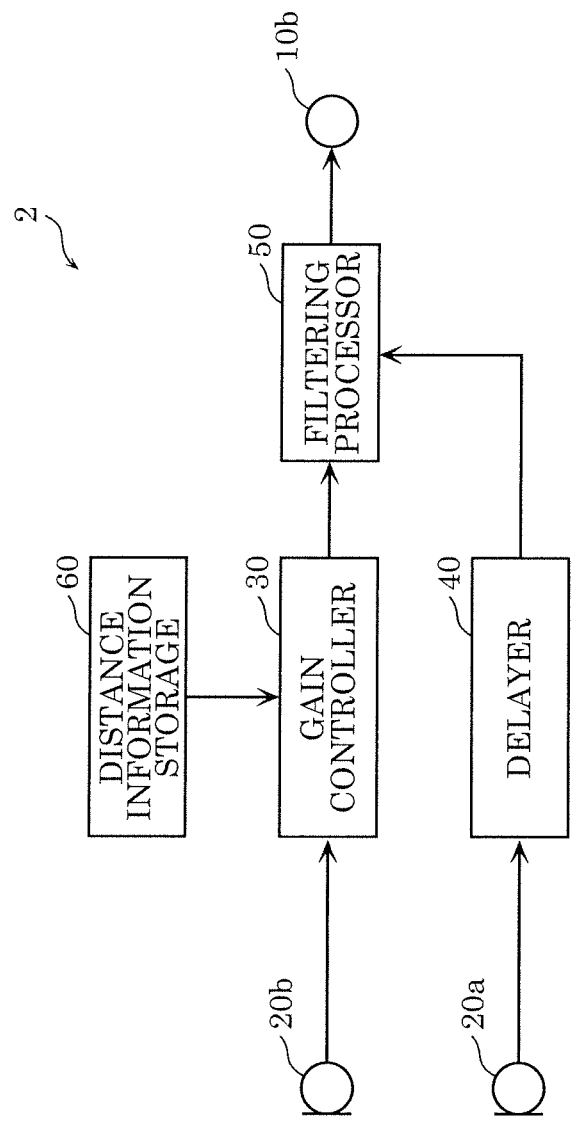
FIG. 2 is a block diagram illustrating a signal processing device that performs signal processing in a time domain in the embodiment.

FIG. 2 is a block diagram illustrating signal processing in a time domain in an embodiment. Signal processing device 2 in an aspect of the present disclosure includes microphone 20a, microphone 20b, gain controller 30, delayer 40, filtering processor 50, distance information storage 60, and output destination 10b.

The configuration described above is for performing signal processing in the time domain. Here, loudspeaker 10a is a specific example of a sound source.

Microphone 20a and microphone 20b each collect voice or the like and convert the sound into a signal. Each of the microphones may be a moving-coil microphone or a ribbon microphone. Each of the microphones may be a condenser microphone, a laser microphone, or the like.

Here, microphone 20a is assumed to be located closer to loudspeaker 10a than microphone 20b.

Delayer 40 delays a signal output from microphone 20a by a predetermined time length. This is because since microphone 20a is located closer to loudspeaker 10a than microphone 20b, an output sound from loudspeaker 10a arrives at microphone 20a earlier than the output sound from loudspeaker 10a arrives at microphone 20b. By delaying the signal output from microphone 20a, the signal output from microphone 20a can be made to coincide in time with a signal output from microphone 20b. That is, by delaying the signal output from microphone 20a, the signal output from microphone 20a can be made to coincide in phase with a signal output from microphone 20b.

The time length by which the signal output from microphone 20a is delayed may be determined from a spatial interval between microphone 20a and microphone 20b. Delayer 40 may delay the signal output from microphone 20a by a time length set in advance or may determine the time length by which the signal output from microphone 20a is delayed at any time using a given algorithm. To delay the signal output from microphone 20a, delayer 40 may perform convolution using an all-pass filter in an infinite impulse response (IIR) filter, or a finite impulse response (FIR) filter. Alternatively, a filter other than the FIR filter or the IIR filter may be designed and used for the convolution.

Gain controller 30 multiplies the signal output from microphone 20b by a predetermined gain. The gain by which the signal output from microphone 20b is multiplied is determined from the positional relation among microphone 20a, microphone 20b, and loudspeaker 10a. The positional relation may be stored in distance information storage 60 in a form of data. In addition, gain controller 30 may read the data relating to the positional relation among microphone 20a, microphone 20b, and loudspeaker 10a that is stored in distance information storage 60 and may use the data for determining the gain.

For example, gain controller 30 may determine a value of the gain by which the signal output from microphone 20b is multiplied based on a ratio of the distance between microphone 20b and loudspeaker 10a with respect to the distance between microphone 20a and loudspeaker 10a.

Here, a specific example of how gain controller 30 determines the gain will be described. For example, with microphone 20a adopted as a reference, the gain by which the signal output from microphone 20b is multiplied is two. This is because a spatial interval between loudspeaker 10a and microphone 20a is 1 cm, while a spatial interval between loudspeaker 10a and microphone 20b is 2 cm. Therefore, the gain by which the signal output from microphone 20b is multiplied is calculated to be 2 cm/1 cm=2.

Filtering processor 50 performs filter processing on the signals output from microphone 20a and microphone 20b. For example, filtering processor 50 subtracts a signal output from microphone 20a and delayed by delayer 40 from a signal output from microphone 20b and multiplied by the gain by gain controller 30.

Delayer 40, gain controller 30, and filtering processor 50 are implemented by a processor and a memory. At this point, delayer 40, gain controller 30, and filtering processor 50 are each provided in a form of a program stored in the memory. As functions of the processor and the memory, the functions provided from cloud computing may be used. Alternatively, delayer 40, gain controller 30, and filtering processor 50 may be implemented not using a processor but in a form of a dedicated logical circuit.

Distance information storage 60 is a storage that holds the data relating to the positional relation among microphone 20a, microphone 20b, and loudspeaker 10a. Distance information storage 60 may hold the data relating to the positional relation among microphone 20a, microphone 20b, and loudspeaker 10a in a form of a database. Distance information storage 60 is implemented by a memory.

Output destination 10b is a device to which a signal subjected to the processing by filtering processor 50 is output. Output destination 10b may be a loudspeaker that outputs the output signal in a form of sound or may be a memory that stores the output signal. Output destination 10b may be either the same or different from loudspeaker 10a.

Figure 3:
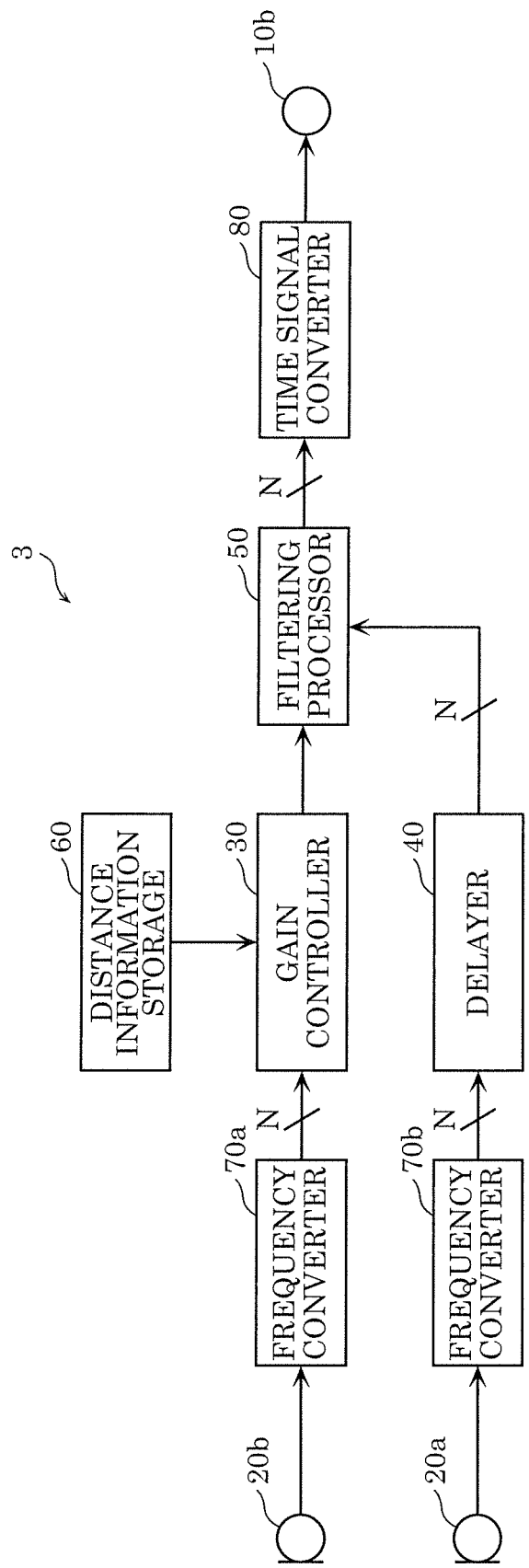
FIG. 3 is a block diagram illustrating a signal processing device that performs signal processing in a frequency domain in the embodiment.

FIG. 3 is a block diagram illustrating signal processing in a frequency domain in an embodiment. Signal processing device 3 in an aspect of the present disclosure include microphone 20a, microphone 20b, delayer 40, gain controller 30, filtering processor 50, distance information storage 60, frequency converter 70a, frequency converter 70b, time signal converter 80, and output destination 10b. The configuration described above is for performing signal processing in the frequency domain.

Microphone 20a, microphone 20b, delayer 40, gain controller 30, filtering processor 50, distance information storage 60, and output destination 10b are the same as microphone 20a, microphone 20b, delayer 40, gain controller 30, filtering processor 50, distance information storage 60, and output destination 10b described with reference to FIG. 2.

Frequency converter 70a and frequency converter 70b each convert a signal in the time domain into a signal in the frequency domain. As an algorithm to convert the signal in the time domain into the signal in the frequency domain, the Fourier transform is used. Alternatively, as the algorithm to convert the signal in the time domain into the signal in the frequency domain, the discrete Fourier transform or the fast Fourier transform may be used.

Time signal converter 80 converts a signal in the frequency domain into a signal in the time domain. As an algorithm to convert the signal in the frequency domain into the signal in the time domain, the inverse Fourier transform is used.

Frequency converter 70a, frequency converter 70b, and time signal converter 80 are implemented by a processor and a memory. As functions of the processor and the memory, the functions provided from cloud computing may be used. Alternatively, frequency converter 70a, frequency converter 70b, and time signal converter 80 may be implemented not using a processor but in a form of a dedicated logical circuit.

N illustrated in the drawing indicates a number of frequency bins.

Here, each of the memories described with reference to FIG. 2 and FIG. 3 may be either a random access memory (RAM) or a dynamic random access memory (DRAM). Each of the memories may be either a static random access memory (SRAM) or a semiconductor integrated circuit. Each of the memories may be either a read only memory (ROM) or a flash memory. As functions of the memory, the functions provided from cloud computing may be used.

Figure 4:
FIG. 4 is a flowchart illustrating a procedure of a signal processing method in the embodiment.

FIG. 4 is a flowchart illustrating a procedure of a signal processing method in an embodiment.

First, microphone 20a and microphone 20b each collect sound (step S1000). Microphone 20a and microphone 20b each convert the collected sound into a signal and output the signal. At this point, a number of the microphones to collect the sound may be M (M is an integer equal to or greater than two).

Next, gain controller 30 multiplies the signal output from microphone 20b by the gain so as to make a sound pressure level of the signal output from microphone 20b equal to a sound pressure level of the signal output from microphone 20a (step S1001). At this point, gain controller 30 may apply a gain to at least one signal so as to equalize sound pressure levels of signals output from M microphones.

Gain controller 30 may be configured to perform the process of step S1001 when loudspeaker 10a is located at a distance at most three times an interval between microphone 20a and microphone 20b, from a microphone closest to loudspeaker 10a. In addition, gain controller 30 may be configured to perform the process of step S1001 when loudspeaker 10a is located at a position at a distance that makes a sound pressure level of an output sound from loudspeaker 10a input to a microphone closest to loudspeaker 10a at least 4/3 times higher than a sound pressure level of an output sound from loudspeaker 10a input to microphone 20b. This is because a significant effect produced by the signal processing method according to the present disclosure cannot be obtained unless there is a difference to a certain degree or higher between the sound pressure level of the output sound from loudspeaker 10a input to microphone 20a and the sound pressure level of the output sound from loudspeaker 10a input to microphone 20b. When loudspeaker 10a is located at the position at the distance that makes the sound pressure level of the output sound from loudspeaker 10a input to the microphone closest to loudspeaker 10a at least 4/3 times higher than the sound pressure level of the output sound from loudspeaker 10a input to microphone 20b, an effect of suppressing the sound output from loudspeaker 10a is obtained to a considerable degree, and an influence of another sound source on the output sound is also reduced.

In addition, in the signal processing method according to the present disclosure, a calculator that calculates a distance from loudspeaker 10a to microphone 20a or microphone 20b may be included. The calculator may be a laser measurement sensor or the like. Alternatively, for example, the calculator may calculate a distance from loudspeaker 10a to microphone 20a or microphone 20b based on a sound pressure level of sounds output from loudspeaker 10a and input to microphone 20a and microphone 20b, in a calibration phase.

Here, gain controller 30 may use the data relating to the positional relation among microphone 20a, microphone 20b, and loudspeaker 10a that is stored in distance information storage 60 to calculate the value of the gain. Alternatively, gain controller 30 may select a proper value from among values of the gain that are predetermined.

In a case where the signals are processed in the frequency domain, frequency converter 70a and frequency converter 70b convert the signal in the time domain into signals in the frequency domain before step S1001 is performed. To convert a signal in the time domain into a signal in the frequency domain, the Fourier transform, the discrete Fourier transform, or the fast Fourier transform may be used.

Delayer 40 then delays the signal output from microphone 20a so as to resolve time discrepancies between the signal output from microphone 20a and the signal output from microphone 20b (step S1002). That is, delayer 40 delays the signal output from microphone 20a so as to make the signal output from microphone 20a and the signal output from microphone 20b coincide in phase. At this point, delayer 40 may delay at least one of the M signals so as to resolve time discrepancies between the M signals output from the M microphones.

Subsequently, filtering processor 50 applies a filter that suppresses signals representing a sound output from loudspeaker 10a located within a predetermined distance from microphone 20a, to the signals output from gain controller 30 and delayer 40 (step S1003). Here, the applied filter may be a filter that performs a process of subtracting the signal output from delayer 40 from the signal output from gain controller 30. That is, the applied filter may be a filter that adds a result of multiplying the signal output from delayer 40 by −1 to the signal output from gain controller 30. Alternatively, filtering processor 50 may apply a filter that suppresses a signal representing a sound of a sound source located within the predetermined distance, to resultant signals. Here, a number of the signals may be M.

In a case where the signals are processed in the frequency domain, the signals in the frequency domain are converted into signals in the time domain by time signal converter 80 after step S1003 is performed. The conversion of the signals from the frequency domain to the time domain may be performed using the inverse Fourier transform.

The procedure of the signal processing method is finished here.

The signal processing included in step S1000 to step S1003 illustrated in FIG. 4 may be performed in either the time domain or the frequency domain.

Note that an order of performing step S1001 and step S1002 may be changed.

In the signal processing method according to an aspect of the present disclosure, processing corresponding to beam former (BF) processing is performed by gain controller 30 and delayer 40. Therefore, the signal processing method according to an aspect of the present disclosure can suppress an output sound from a sound source close to a microphone even in a case where sounds are output simultaneously from both of a sound source close to the microphone and a sound source far from the microphone.

[Frequency Characteristics after the Signal Processing for a Nearby Sound Source and a Far Sound Source]

Figure 5:
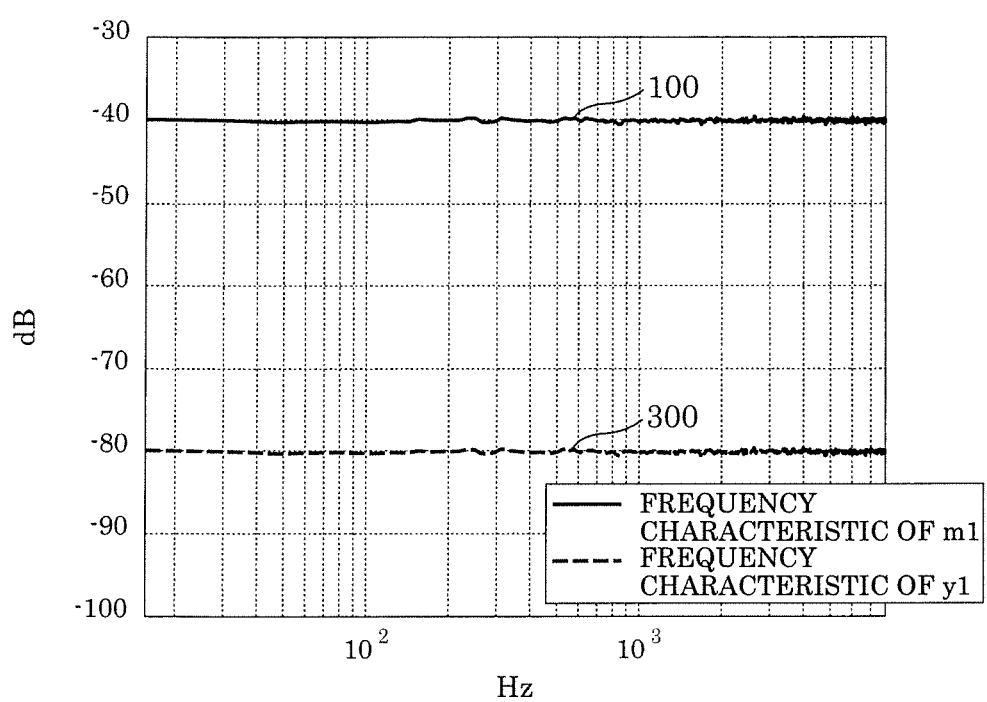
FIG. 5 is a graph illustrating frequency characteristics after signal processing for a nearby sound source in the embodiment.

FIG. 5 is a graph illustrating frequency characteristics after the signal processing for a nearby sound source in an embodiment. Line 100 indicates a signal output from microphone 20a when a sound is output from loudspeaker 10a located close to microphone 20a. Line 300 indicates a signal output from filtering processor 50 when the sound is output from the loudspeaker located close to microphone 20a. As the sound output from loudspeaker 10a, white noise is adopted.

Let m1($t$) denote the signal output from microphone 20a when the sound is output from loudspeaker 10a located close to microphone 20a and m2($t$) denote a signal output from microphone 20b when the sound is output from loudspeaker 10a close to microphone 20a. Here, t indicates a sample of discrete time. Let delay time $\tau$ denote a difference in time between a time when the output sound from loudspeaker 10a arrives at microphone 20a and a time when the output sound from loudspeaker 10a arrives at microphone 20b. In addition, let G denote a gain that gain controller 30 gives to m1($t$). Here, let y1($t$) denote the signal output from filtering processor 50. Filtering processor 50 performs a process expressed as y1($t$)=G×m2($t$)−m1($t$)*h($\tau$). The sign * indicates the filter processing and h($\tau$) indicates a filter that delays a signal by time length $\tau$.

As described above, gain G is determined from the ratio between the distance between loudspeaker 10a and microphone 20a and the distance between loudspeaker 10a and microphone 20b. Specifically, gain G is determined so that the sound pressure level of the output sound from loudspeaker 10a indicated by the signal output from microphone 20b is the same level as the sound pressure level of the output sound from loudspeaker 10a indicated by the signal output from microphone 20a.

In addition, the processing by delayer 40 makes the signal output from microphone 20b indicating the output sound from loudspeaker 10a coincide in phase with the signal output from microphone 20a indicating the output sound from loudspeaker 10a.

Accordingly, through the process that subtracts the signal having the same sound pressure level and the same phase one from another, the sound pressure level of signal y1(t) is lower than the sound pressure level of m1(t). As illustrated in FIG. 5, line 100 indicates −40 dB and line 300 indicates −80 dB. That is, the output sound from loudspeaker 10a is suppressed by the signal processing method according to the present disclosure.

For example, consider a case where the distance between loudspeaker 10a and microphone 20a is 1 cm, the distance between microphone 20a and microphone 20b is 1 cm, and a distance between loudspeaker 10a and microphone 20b is 2 cm. At this point, from the positional relation among loudspeaker 10a, microphone 20a, and microphone 20b, gain G by which signal m2(t) is multiplied is two. In addition, from the positional relation among loudspeaker 10a, microphone 20a, and microphone 20b, the sound pressure level of signal m2(t) is ½ of the sound pressure level of signal m1(t). Therefore, by being multiplied by the gain being two, the sound pressure level of signal m2(t) is substantially the same as the sound pressure level of signal m1(t). In addition, delayer 40 gives signal m1(t) a delay time that is equal to a difference in time between a time when the output sound from loudspeaker 10a arrives at microphone 20a and a time when the output sound from loudspeaker 10a arrives at microphone 20b, so that signal m1(t) and signal m2(t) are made to coincide in phase. Subtracting the signal m1(t) that coincides in phase with the signal m2(t) from the signal m2(t) given the gain being two therefore makes a sound pressure of the signal representing the output sound from loudspeaker 10a close to zero. As a result, the signal processing method according to an aspect of the present disclosure can suppress the signal representing the output sound from loudspeaker 10a.

Figure 6:
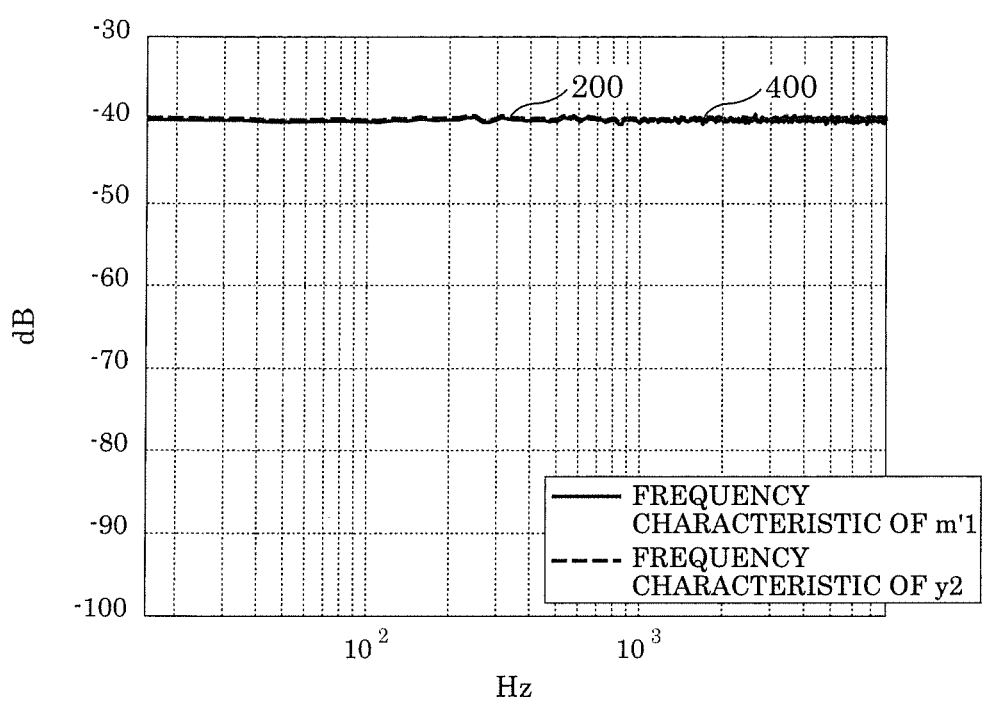
FIG. 6 is a graph illustrating frequency characteristics after signal processing for a far sound source in the embodiment.

FIG. 6 is a graph illustrating frequency characteristics after the signal processing for a far sound source in an embodiment. Line 200 indicates a signal output from microphone 20a when speaking person 1 located far from microphone 20a makes a voice. Line 400 indicates a signal output from filtering processor 50 when speaking person 1 located far from microphone 20a makes a voice. As the voice output from speaking person 1, white noise is adopted.

Let m'1(t) denote a signal output from microphone 20a when speaking person 1 located far from microphone 20a makes a voice and m'2(t) denote a signal output from microphone 20b when speaking person 1 located far from microphone 20a makes a voice. Here, t indicates a sample of discrete time. Let delay time τ denote a difference in time between a time when the voice made by speaking person 1 arrives at microphone 20a and a time when the voice made by speaking person 1 arrives at microphone 20b. In addition, let G denote a gain that gain controller 30 gives to m'1(t). Here, let y2(t) denote the signal output from filtering processor 50. Filtering processor 50 performs a process expressed as y2(t)=G×m'2(t)−m'1(t)*h(τ). The sign * indicates the filter processing and h(τ) indicates a filter that delays a signal by time length τ.

Gain G is determined as described above. In addition, the processing by filtering processor 50 makes the voice made by speaking person 1 and input to microphone 20b coincide in phase with the voice made by speaking person 1 and input to microphone 20a.

Therefore, a sound pressure level of signal y2(t) has a value that is substantially the same as a value of a sound pressure level of m'1(t). This is because there is little difference in sound pressure level between m'1(t) and m'2(t). The reason that m'1(t) and m'2(t) makes the little difference in sound pressure level is that a difference between the distance between speaking person 1 and microphone 20a and the distance between speaking person 1 and microphone 20b has a low ratio to the distance between speaking person 1 and microphone 20a or the distance between speaking person 1 and microphone 20b.

For that reason, the sound pressure level of signal y2(t) is not equal to about zero. For example, the sound pressure level of signal y2(t) is substantially equal to signal m'1(t). As illustrated in FIG. 6, line 200 indicates −40 dB, and line 400 also indicates −40 dB. That is, the voice made by speaking person 1 is not suppressed by the signal processing method according to the present disclosure.

Consider a case where, for example, the distance between speaking person 1 and microphone 20a is 50 cm, the distance between microphone 20a and microphone 20b is 1 cm, and the distance between speaking person 1 and microphone 20b is 51 cm. At this point, from the positional relation among speaking person 1, microphone 20a, and microphone 20b, gain G by which signal m'2(t) is multiplied is two. In addition, from the positional relation among loudspeaker 10a, microphone 20a, and microphone 20b, the sound pressure level of signal m'2(t) is 50/51 of the sound pressure level of signal m'1(t). Therefore, by being multiplied by the gain being two, the sound pressure level of signal m'2(t) is substantially about twice the sound pressure level of signal m'1(t). In addition, delayer 40 delays signal m'1(t) by a delay time that is equal to a difference in time between a time when the voice made by speaking person 1 arrives at microphone 20a and a time when the voice made by speaking person 1 arrives at microphone 20b, so that signal m'1(t) and signal m'2(t) are made to coincide in phase. Subtracting the signal m'1(t) that coincides in phase with the signal m'2(t) from the signal m'2(t) given the gain being two therefore makes a sound pressure of the signal representing the voice made by speaking person 1 close to a sound pressure of signal m'1(t) or signal m'2(t). As a result, the signal processing method according to an aspect of the present disclosure does not suppress the signal representing the voice made by speaking person 1.

That is, the signal processing method according to an aspect of the present disclosure enables a blind spot to be formed within a range of a predetermined distance or shorter in sound collection using a plurality of microphones.

Figure 7:
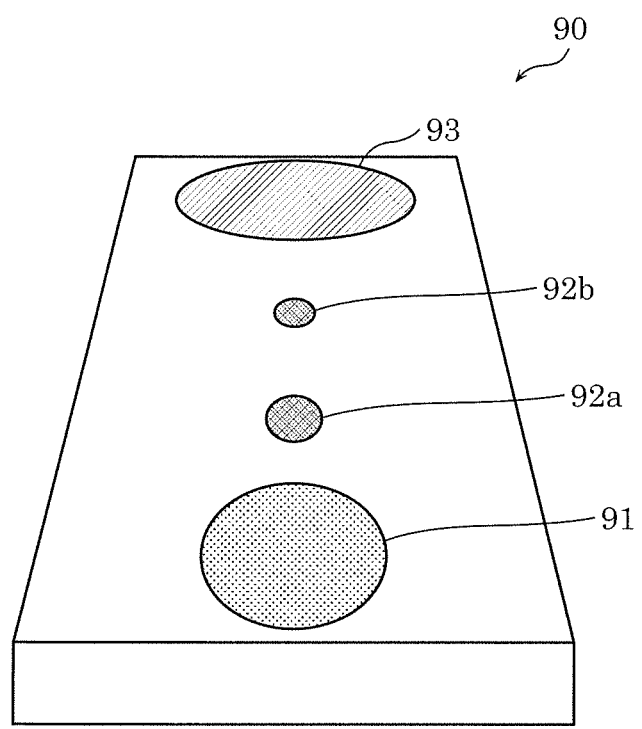
FIG. 7 is a diagram illustrating a specific example of an emergency call system (e-call) to which a signal processing method according to the embodiment is applied.

FIG. 7 is a diagram illustrating a specific example of an emergency call system (e-call) to which the signal processing method according to the present disclosure in an embodiment is applied. Emergency call system 90 includes loudspeaker 91, microphone 92a, microphone 92b, and button 93. For example, emergency call system 90 may be a module having a box shape such as a rectangular parallelepiped. The shape of emergency call system 90 is not limited to the above shape. Emergency call system 90 may have a box shape such as a cube, a shape such as a polyhedron, or a cylindrical or spherical shape.

In case of emergency, a user can press button 93 to signal the emergency. The user can then transmit voice to an operator or the like with microphone 92a and microphone 93b. In addition, the user can hear voice of the operator or the like from loudspeaker 91.

Emergency call system 90 is a relatively small module, and thus loudspeaker 91 is also small. In addition, loudspeaker 91, microphone 92*a*, and microphone 92*b* are disposed close to each other. As illustrated in FIG. 7, a positional relation among loudspeaker 91, microphone 92*a*, and microphone 92*b* in emergency call system 90 is similar to the positional relation among loudspeaker 10*a*, microphone 20*a*, and microphone 20*b* in the signal processing device according to an aspect of the present disclosure.

Figure 8:
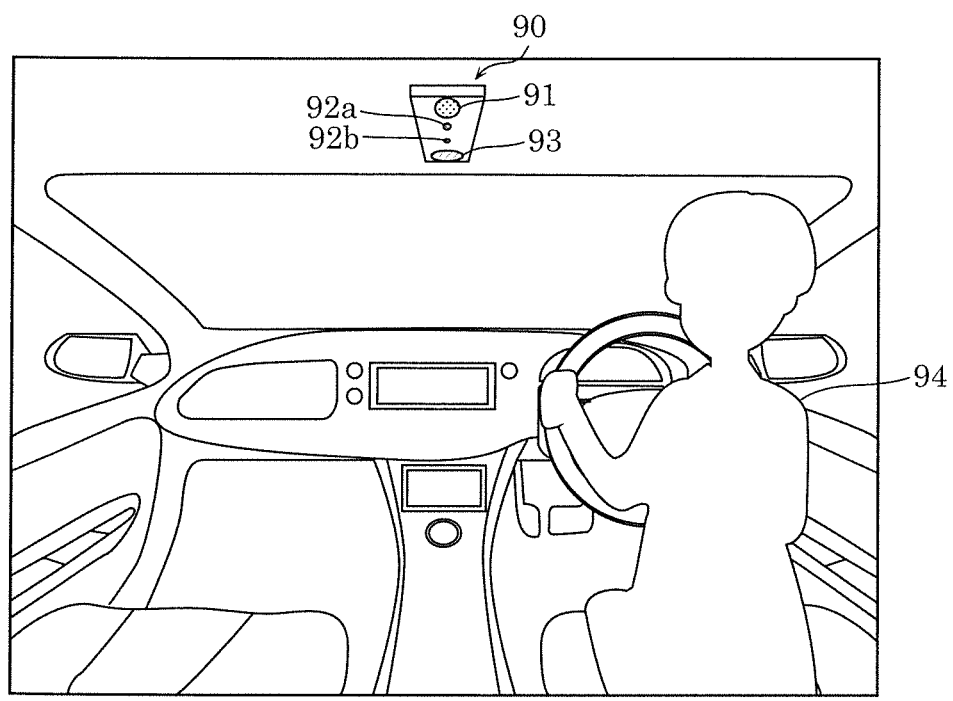
FIG. 8 is a diagram illustrating how the emergency call system (e-call) to which the signal processing method according to the embodiment is applied is set up in a vehicle interior.

FIG. 8 is a diagram illustrating how the emergency call system (e-call) to which the signal processing method according to the present disclosure in an embodiment is applied is set up in a vehicle interior. In FIG. 8, emergency call system 90 is attached to a ceiling between a driver's seat and a front passenger seat in the vehicle interior. Specifically, emergency call system 90 is set up in a vicinity of a place between the driver's seat and the front passenger seat in the vehicle interior where a room lamp or the like is set up. Note that the place where emergency call system 90 is set up is not limited to the ceiling. Emergency call system 90 may be attached to a dashboard in the vehicle interior.

Next, a positional relation among loudspeaker 91, microphone 92*a*, microphone 92*b*, and driver 94 in a case where emergency call system 90 is actually attached to the vehicle interior will be described. In emergency call system 90, microphone 92*a* and microphone 92*b* are set up close to each other. In emergency call system 90, loudspeaker 91 is also set up close to microphone 92*a* and microphone 92*b*. Distances among loudspeaker 91, microphone 92*a*, and microphone 92*b* are several millimeters to several centimeters. In contrast, driver 94 who is to make a voice to loudspeaker 91 is away from microphone 92*a* and microphone 92*b*. Specifically, driver 94 is located at a distance of several tens of centimeters from microphone 92*a* and microphone 92*b*.

As illustrated in FIG. 8, a positional relation among loudspeaker 91, microphone 92*a*, microphone 92*b*, and driver 94 in emergency call system 90 is similar to the positional relation among loudspeaker 10*a*, microphone 20*a*, microphone 20*b*, and speaking person 1 in the signal processing device according to an aspect of the present disclosure.

[Supplemental Remarks]

The configuration of signal processing device 2 illustrated in FIG. 2 includes the two microphones, microphone 20*a* and microphone 20*b*, but is not limited to this. The number of the microphones may be M (M is an integer equal to or greater than two). Here, the M microphones include at least two microphones having different distances from loudspeaker 10*a*.

In a case where the number of microphones is M, two of the M microphones may be selected, and the configuration illustrated in FIG. 2 to FIG. 4 may be applied to the two microphones. Of the M microphones, a plurality of sets of two microphones may be selected, and the configuration illustrated in FIG. 2 to FIG. 4 may be applied to each of the plurality of sets.

In a case where the number of microphones is M, a microphone located closest to loudspeaker 10*a* is connected to the delayer. (M−1) microphones other than the microphone closest to loudspeaker 10*a* are connected to delayers and gain controllers, respectively. The filtering processor performs the filter processing on signals that are output from the (M−1) microphone other than the microphone closest to loudspeaker 10*a*, input to the (M−1) delayers, then output from the (M−1) delayers, further input to the (M−1) gain controllers, and then output from the (M−1) gain controllers and a signal that is output from the microphone located closest to loudspeaker 10*a*, input to the delayer, and then output from the delayer. The signals subjected to the filter processing are input to output destination 10*b* and output from output destination 10*b*.

The signals that are output from the (M−1) microphone other than the microphone closest to loudspeaker 10*a*, input to the (M−1) delayers, then output from the (M−1) delayers, further input to the (M−1) gain controllers, and then output from the (M−1) gain controllers may be signals output from the (M−1) microphones other than the microphone closest to loudspeaker 10*a*, input to the (M−1) gain controllers, then output from the (M−1) gain controllers, further input to the (M−1) delayers, and then output from the (M−1) delayers.

Alternatively, the filter processing performed here may be a process of, for example, multiplying the signals output from the (M−1) microphones other than the microphone closest to loudspeaker 10*a* by a value of an appropriate gain so that a sum of sound pressure levels of the signals output from the (M−1) microphones other than the microphone closest to loudspeaker 10*a* is equal to a sound pressure level of the signal that is output from the microphone located closest to loudspeaker 10*a*, input to the delayer, and then output from the delayer. The filter processing subsequently performed here may be a process of subtracting the signals that are output from the (M−1) microphone other than the microphone closest to loudspeaker 10*a*, input to the (M−1) delayers, then output from the (M−1) delayers, further input to the (M−1) gain controllers, and then output from the (M−1) gain controllers, from the signal that is output from the microphone located closest to loudspeaker 10*a*, input to the delayer, and then output from the delayer. Conversely, the filter processing subsequently performed here may be a process of subtracting the signal that is output from the microphone located closest to loudspeaker 10*a*, input to the delayer, and then output from the delayer, from the signals that are output from the (M−1) microphones other than the microphone closest to loudspeaker 10*a*, input to the (M−1) delayers, then output from the (M−1) delayers, further input to the (M−1) gain controllers, and then output from the (M−1) gain controllers.

Alternatively, the filter processing performed here may be a process of subtracting the signals that are output from the (M−1) microphone other than the microphone closest to loudspeaker 10*a*, input to the (M−1) delayers, then output from the (M−1) delayers, further input to the (M−1) gain controllers, and then output from the (M−1) gain controllers, from the signal that is output from the microphone located closest to loudspeaker 10*a*, input to the delayer, then output from the delayer, and multiplied by M.

Alternatively, the filter processing performed here may be a process of another kind that can suppress signals representing an output sound from loudspeaker 10*a* collected by the M microphones, using the signals output from the M microphones.

In the case where signal processing device 2 is made up of the M microphones, signal processing device 2 may have the above configuration for each of N sound sources (loudspeakers, etc.) (N is an integer equal to or greater than two).

The configuration of signal processing device 3 illustrated in FIG. 3 includes the two microphones, microphone 20*a* and microphone 20*b*, but is not limited to this. The number of the microphones may be M (M is an integer equal to or greater than two). In a case where the number of microphones is M, a microphone located closest to loudspeaker 10*a* is connected to the frequency converter and the delayer. (M−1) microphones other than the microphone closest to loudspeaker 10*a* are connected to the frequency converters, the delayers, and the gain controllers, respectively. The filtering processor performs the filter processing on signals that are output from the (M−1) microphone other than the microphone closest to loudspeaker 10a, go through the frequency converters, are input to the (M−1) delayers, then output from the (M−1) delayers, further input to the (M−1) gain controllers, and then output from the (M−1) gain controllers and a signal that is output from the microphone located closest to loudspeaker 10a, goes through the frequency converter, is input to the delayer, and then output from the delayer. The signals subjected to the filter processing are input to the time signal converter, output from the time signal converter, then input to output destination 10b, and output from output destination 10b.

The signals that are output from the (M−1) microphone other than the microphone closest to loudspeaker 10a, go through the frequency converters, are input to the (M−1) delayers, then output from the (M−1) delayers, further input to the (M−1) gain controllers, and then output from the (M−1) gain controllers may be signals that are output from the (M−1) microphones other than the microphone closest to loudspeaker 10a, go through the frequency converters, are input to the (M−1) gain controllers, then output from the (M−1) gain controllers, further input to the (M−1) delayers, and then output from the (M−1) delayers.

Alternatively, the filter processing performed here may be a process of, for example, multiplying the signals that are output from the (M−1) microphones other than the microphone closest to loudspeaker 10a and go through the frequency converters by a value of an appropriate gain so that a sum of sound pressure levels of the signals that are output from the (M−1) microphones other than the microphone closest to loudspeaker 10a and go through the frequency converters is equal to a sound pressure level of the signal that is output from the microphone located closest to loudspeaker 10a, goes through the frequency converter, is input to the delayer, and then output from the delayer. The filter processing subsequently performed here may be a process of subtracting the signals that are output from the (M−1) microphone other than the microphone closest to loudspeaker 10a, go through the frequency converters, are input to the (M−1) delayers, then output from the (M−1) delayers, further input to the (M−1) gain controllers, and then output from the (M−1) gain controllers, from the signal that is output from the microphone located closest to loudspeaker 10a, goes through the frequency converter, is input to the delayer, and then output from the delayer. Conversely, the filter processing subsequently performed here may be a process of subtracting the signal that is output from the microphone located closest to loudspeaker 10a, goes through the frequency converter, is input to the delayer, and then output from the delayer, from the signals that are output from the (M−1) microphone other than the microphone closest to loudspeaker 10a, go through the frequency converters, are input to the (M−1) delayers, then output from the (M−1) delayers, further input to the (M−1) gain controllers, and then output from the (M−1) gain controllers.

Alternatively, the filter processing performed here may be a process of subtracting the signals that are output from the (M−1) microphone other than the microphone closest to loudspeaker 10a, go through the frequency converters, are input to the (M−1) delayers, then output from the (M−1) delayers, further input to the (M−1) gain controllers, and then output from the (M−1) gain controllers, from the signal that is output from the microphone located closest to loudspeaker 10a, goes through the frequency converter, is input to the delayer, then output from the delayer, and multiplied by M.

Alternatively, the filter processing performed here may be a process of another kind that can suppress signals representing an output sound from loudspeaker 10a collected by the M microphones, using the signals output from the M microphones.

In a case where signal processing device 3 is made up of the M microphones, signal processing device 3 may have the above configuration for each of N sound sources (loudspeakers, etc.) (N is an integer equal to or greater than two).

In the present embodiment, each of the structural elements may be configured in the form of an exclusive hardware product, or may be implemented by executing a software program suitable for the structural element. Each of the structural elements may be implemented by means of a program execution unit, such as a CPU or a processor, reading and executing a software program recorded on a recording medium such as a hard disk or a semiconductor memory.

More specifically, signal processing device 2 and signal processing device 3 may each include processing circuitry and storage which is electrically connected to the processing circuitry and accessible from the processing circuitry.

The processing circuitry includes at least one of an exclusive hardware product and a program execution unit, and performs processing using the storage. When the processing circuitry includes a program execution unit, the storage stores a software program executed by the program execution unit.

Here, the software for implementing the signal processing method according to the present embodiment includes a program as below.

That is to say, the program may cause a computer to execute a signal processing method including: multiplying at least one of M signals output from M microphones by a gain so as to equalize sound pressure levels of the M signals, the M signals representing sounds that arrive at the M microphones from a sound source located within a predetermined distance from the M microphones, M being an integer equal to or greater than two; delaying at least one of the M signals so as to resolve time discrepancies between the M signals, the time discrepancies being caused by differences in arrival time between sounds that arrive at the M microphones from the sound source; and applying a filter to the M signals that are obtained through the multiplying and the delaying, so as to generate a signal in which a sound output from the sound source located within the predetermined distance is suppressed, wherein the sound source is located within the predetermined distance from a microphone included in the M microphones which is located closest to the sound source.

The structural elements may be circuits as described above. The circuits may constitute circuitry as a whole, or may be individual circuits. Each structural element may be implemented by a general processor, or may be implemented by an exclusive processor.

Moreover, processing executed by a particular structural element may be executed by another structural element.

Although a signal processing method, signal processing device 2, and signal processing device 3 have been described above based on an embodiment, the signal processing method and the signal processing devices are not limited to this embodiment. Various modifications to this embodiment that are conceivable to those skilled in the art, as well as embodiments resulting from combinations of structural elements in different embodiments, may be included within the scope of one or more aspects, so long as they do not depart from the essence of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to, for example, an emergency call system (e-call), a smartphone, a video conference system, or a microphone and a loudspeaker used in conference.

What is claimed is:

1. A signal processing method, comprising:
   multiplying at least one of M signals output from M microphones by a gain so as to equalize sound pressure levels of the M signals, the M signals representing sounds that arrive at the M microphones from a sound source located within a predetermined distance from the M microphones, M being an integer equal to or greater than two;
   delaying at least one of the M signals so as to resolve time discrepancies between the M signals, the time discrepancies being caused by differences in arrival time between sounds that arrive at the M microphones from the sound source; and
   applying a filter to the M signals that are obtained through the multiplying and the delaying, so as to generate a signal in which a sound output from the sound source located within the predetermined distance is suppressed, wherein
   the sound source is located within the predetermined distance from a microphone included in the M microphones which is located closest to the sound source.

2. The signal processing method according to claim 1, wherein
   the predetermined distance is a distance at most three times a longest spatial interval of spatial intervals between the M microphones.

3. The signal processing method according to claim 1, wherein
   the predetermined distance is a distance that makes a sound pressure level of a sound arriving, from the sound source, at the microphone located closest to the sound source at least 4/3 times higher than a sound pressure level of a sound arriving, from the sound source, at a microphone included in the M microphones which is located farthest from the sound source.

4. The signal processing method according to claim 1, further comprising:
   calculating a spatial position at which the sound source is located.

5. The signal processing method according to claim 1, wherein
   the multiplying, the delaying, and the applying are performed in a frequency domain.

6. The signal processing method according to claim 1, wherein
   the multiplying, the delaying, and the applying are performed in a time domain.

7. A signal processing device, comprising:
   a gain controller configured to multiply at least one of M signals output from M microphones by a gain so as to equalize sound pressure levels of the M signals, the M signals representing sounds that arrive at the M microphones from a sound source located within a predetermined distance from the M microphones, M being an integer equal to or greater than two;
   a delayer configured to delay at least one of the M signals so as to resolve time discrepancies between the M signals, the time discrepancies being caused by differences in arrival time between sounds that arrive at the M microphones from the sound source; and
   a filtering processor configured to apply a filter to the M signals that are obtained by the gain controller and the delayer, so as to generate a signal in which a sound output from the sound source located within the predetermined distance is suppressed, wherein
   the sound source is located within the predetermined distance from a microphone included in the M microphones which is located closest to the sound source.

8. A non-transitory computer-readable recording medium for use in a computer, the recording medium having a computer program recorded thereon for causing the computer to execute the signal processing method according to claim 1.

* * * * *